March 10, 1936.                    J. B. BRENNAN                    2,033,226
                                      PISTON
                              Filed Nov. 21, 1932

Witness
H. E. Van Dine.

Inventor
Joseph B. Brennan
by his attorneys
Van Everen, Fish, Hildreth & Cary

Patented Mar. 10, 1936

2,033,226

UNITED STATES PATENT OFFICE 2,033,226

PISTON

Joseph B. Brennan, Fort Wayne, Ind.

Application November 21, 1932, Serial No. 643,639

3 Claims. (Cl. 309—14)

The present invention relates to pistons and methods of making the same.

The object of the present invention is to provide a simple, inexpensively constructed and accurately formed piston for internal combustion engines.

My co-pending application 643,638 filed of even date herewith, describes a form of sheet metal piston fabricated by hydraulic expansion or by mechanical rolling with ring grooves of any suitable dimensions. According to the present invention, a piston of generally similar construction is provided with a minimum of mechanical operations.

Figure 1:
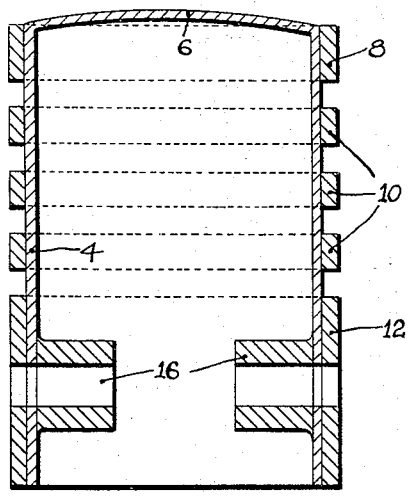
Figure 2:
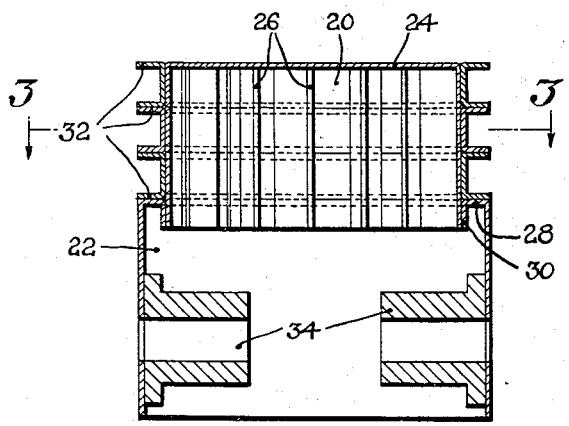
Figure 3:
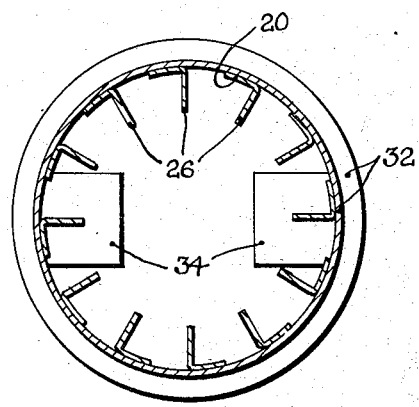

In the accompanying drawing, Fig. 1 is a sectional elevation of one form of piston according to the present invention; Fig. 2 is a section of a modified form of piston; and Fig. 3 is a section on line 3—3 of Fig. 2.

The piston shown in Fig. 1 comprises a seamless drawn closed end cylindrical tube 4, preferably with a dome head 6. Fitted over the tube near the head is a ring 8 accurately formed of proper dimensions for the desired clearance with the cylinder wall. Immediately below the ring 8 is a set of three rings 10 of the same external dimensions. The rings 8 and 10 are preferably shrunk on the tube 4 and secured in place by copper brazing in a hydrogen atmosphere. The spaces between the rings afford annular recesses to receive the customary piston rings. Below the ring 10, the piston is fitted with a skirt 12 which comprises a ring formed similarly to the rings 8 and 10 but of greater length. Internally the piston is provided with wrist pin bearings 16. The skirt ring 12 and the bearings 16 may also be secured to the tube 4 by copper brazing.

The modified form of piston shown in Fig. 2 is in some respects preferable in that it permits more convenient assembly. This construction comprises an upper sleeve portion 20 and a lower skirt portion 22. The sleeve portion 20 is formed with a head 24 and with internally projecting heat radiating fins 26 which are struck up from the walls of the sleeve. The skirt portion 22 comprises a tube of slightly greater diameter having at its upper end an internally extending flange 28 and a downwardly turned cylindrical flange 30. The sleeve portion and the flange 30 are suitably welded or brazed together. The sleeve portion is provided with a series of annular channels 32, each of which has an internal diameter to fit closely over the sleeve and an external diameter to lie flush with the skirt portion 22. The channel members constitute the ring grooves of the piston and are preferably shrunk on the sleeve member and brazed thereto. The channels also seal the openings in the sleeve. The wrist pin bearings 34 are secured internally of the skirt portion, as in the construction previously described.

Since the piston is constructed entirely of sheet metal parts, it is of exceptionally light weight and small inertia. In either form of the invention, the dimensions may be made to substantially any degree of accuracy, thus insuring proper clearances.

Having thus described the invention, what is claimed is:

1. A piston comprising a head having depending inwardly extended fins, the outer edges of the fins lying on a cylindrical surface and forming a plurality of longitudinally extending spaces around the cylindrical surface, and a plurality of annular ring-receiving members of uniform external diameter secured externally of the fins and closing the spaces between the fins.

2. A piston comprising a head having depending inwardly extended fins, the outer edges of the fins lying on a cylindrical surface and forming a plurality of longitudinally extending spaces around the cylindrical surface, and a plurality of annular channel members secured externally of the fins, the channel members being secured together axially to close the spaces between the fins.

3. A piston comprising a head having depending inwardly extended fins, the outer edges of the fins lying on a cylindrical surface and forming a plurality of longitudinally extending spaces around the cylindrical surface, a plurality of annular ring-receiving members of uniform external diameter secured externally of the fins and closing the spaces between the fins, and a skirt of substantially the same external diameter as the ring-receiving members and having an internal portion secured externally of the fins, the skirt being secured axially adjacent the lowermost ring receiving member.

JOSEPH B. BRENNAN.